Figure 1:
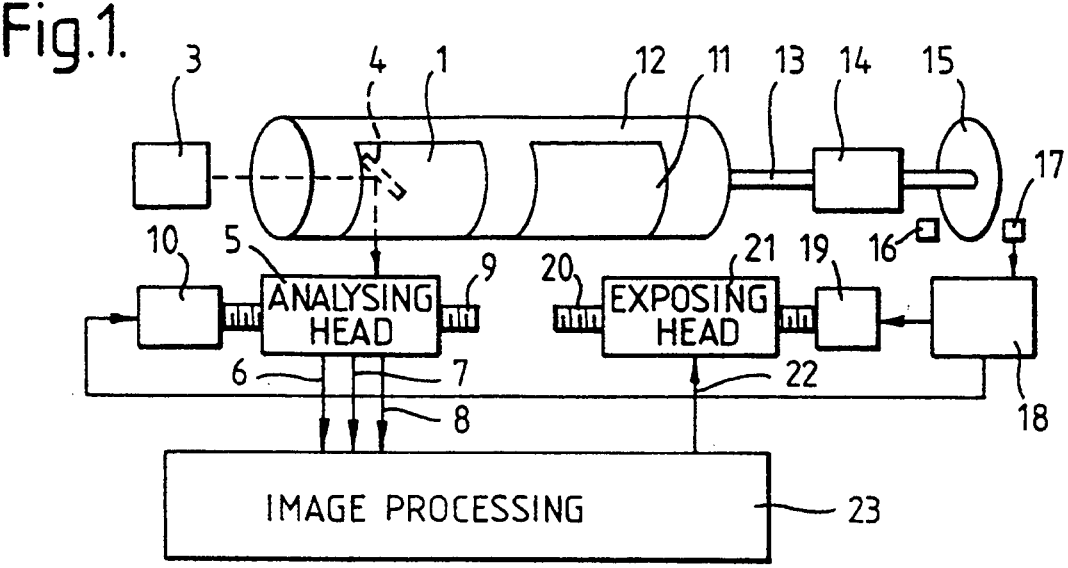

United States Patent [19]
Gouch

[11] Patent Number: 5,373,373
[45] Date of Patent: Dec. 13, 1994

[54] SCANNING APPARATUS

[75] Inventor: Martin P. Gouch, Hemel Hempstead, England

[73] Assignee: Crosfield Electronics Limited, Hemel Hempstead, England

[21] Appl. No.: 108,443

[22] Filed: Aug. 19, 1993

[30] Foreign Application Priority Data

Aug. 21, 1992 [GB] United Kingdom ............... 9217848

[51] Int. Cl.[5] .............................................. H04N 1/04
[52] U.S. Cl. ................................. 358/487; 355/75; 355/125
[58] Field of Search ................... 358/487; 156/99; 355/75, 77, 125, 131

[56] References Cited

U.S. PATENT DOCUMENTS

| | | | |
|---|---|---|---|
| 3,876,299 | 4/1975 | Brown, Jr. | 353/120 |
| 4,319,252 | 3/1982 | Drexler | 346/135.1 |
| 4,575,398 | 3/1986 | Tschishow | 156/99 |
| 4,593,326 | 6/1986 | Chevalier | 358/299 |
| 4,696,860 | 9/1987 | Epperson | 428/325 |
| 5,002,250 | 3/1991 | Hemmingsten | 348/363 |

FOREIGN PATENT DOCUMENTS 0315544 1/1991 Japan .
0511429 1/1993 Japan .

OTHER PUBLICATIONS

Patent Abstracts of Japan, vol. 4, No. 58, (P-9), Apr. 30, 1980 (JP-A-55 029 875).
Patent Abstracts of Japan, vol. 17, No. 273 (P-1545), May 26, 1993 (JP-A-05 011 429).
Patent Abstracts of Japan, vol. 15, No. 129 (M-1098), Mar. 28, 1991 (JP-A-03 015 544).
Patent Abstracts of Japan, vol. 9, No. 329 (P-416), Dec. 24, 1985 (JP-A-60 154 242).

Primary Examiner—Edward L. Coles, Sr.
Assistant Examiner—Madeleine Anh-Vinh Nguyen
Attorney, Agent, or Firm—Sughrue, Mion, Zinn, Macpeak & Seas

[57] ABSTRACT

The invention relates to scanning apparatus including a transparency support (12) and scanning means (3,4,5) for scanning a transparency (1) on the support to generate an electronic representation of an image defined by the transparency (1). The surface (24) of the support (12) which carries a transparency (1) in use has a surface profile with irregular undulations (25) such that any Newton's rings formed between the transparency (1) and the surface (24) of the support (12) cannot be resolved by the scanning means in use. Methods of producing the irregular undulations are also described.

13 Claims, 2 Drawing Sheets

SCANNING APPARATUS

FIELD OF THE INVENTION

This invention relates to scanning apparatus for scanning a transparency.

DESCRIPTION OF THE PRIOR ART

When transparencies are mounted directly onto a supporting surface such as a scanner drum, an air gap is formed between the transparency and the supporting surface in which Newton's rings can be set-up. This is caused by interference between the partial reflections at the transparency surface and the supporting surface. The Newton's rings formed are of high enough contrast to give unwanted patterning when the transparency is scanned.

Conventionally, for low enlargements an anti-Newton's rings spray has been used which attaches small particles to the transparency surface to break-up the structure of the Newton's rings so that they become indiscernible by the scanner. After scanning the transparency, the spray is removed by use of a suitable solvent.

For high enlargements the anti-Newton's rings spray is not used because the scanner begins to discern the small particles attached to the transparency and this provides an additional grainy effect in the separations. Therefore, a layer of oil is applied to the gap between the transparency and the supporting surface to reduce the partial reflections from the two surfaces and hence the contrast of the Newton's rings to a point where the scanner can no longer discern them. However, the use of oil can be difficult and messy and great care is required to avoid air bubbles being trapped as the transparency and oil film are laid down on the supporting surface.

An alternative type of anti-Newton's ring spray is described in U.S. Pat. No. 4,575,398. A substantially transparent resin film is formed on the surface of a transparency by spraying the transparency with a resinous solution in a suitable solvent. The resin film forms a slightly rough layer between the transparency and the outer surface of the scanner cylinder. The resin film may also be formed on the surface of the scanner cylinder. In this case, the film (if it is robust enough) need not be removed from the cylinder but unless the resin is very tough it will wear away with cleaning and need replacing. Where the film is formed on the surface of the cylinder, the transparency will have a number of points of contact with the rough surface of the film. The film acts as a spacer between the transparency and the cylinder, making the coherence length too short for the gap and thus no rings can be formed, apart from around the contact points. In addition, the film inhibits the reflection of light between the transparency and the cylinder by reducing the rapid dielectric boundary between the two surfaces. A further problem with this technique is that it permits the film to droop between contact points, possibly going out of focus. This technique also seeks to prevent the formation of detectable Newton's rings by reducing their contrast.

A further method of preventing Newton's ring formation by reducing partial reflections, is to provide an antireflection coating on the surface of the drum. This is described in JP-A-55029875, using a film composed of LiF, SiO, ZnS etc.

In scanning of colour transparencies there are typically 256 levels of digitization and therefore the intensity of the Newton's rings must be reduced to a very small value. For example, an intensity of 2 to 3 percent would be easily discernible by the scanner producing unwanted patterning in the scanned image.

SUMMARY OF THE INVENTION

In accordance with the present invention, we provide scanning apparatus including a transparency support defining a transparency support surface and scanning means for scanning a transparency on said support surface of said support to generate an electronic representation of an image defined by said transparency, wherein said transparency support surface defines a surface profile with irregular undulations such that any Newton's rings formed between said transparency support surface and said transparency cannot be resolved by said scanning means. By forming irregular undulations on the surface of the transparency support, detectable Newton's rings are suppressed by breaking up the structure so that they become undetectable. If the frequency of the rings formed due to the undulations is high enough the scanner will not resolve the rings and will blur them together. Thus making the rings appear a uniform white.

In accordance with a second aspect of the present invention, we present a method of producing a transparency support defining a transparency support surface for scanning apparatus, said scanning apparatus including scanning means for scanning said transparency on said transparency support surface to generate an electronic representation of an image defined by said transparency, the method including the step of providing irregular undulations in said transparency support surface, wherein said transparency support surface is formed with a surface profile having irregular undulations such that any Newton's rings formed between said transparency support surface and said transparency cannot be resolved by said scanning means.

The irregular undulations may be formed by embossing the surface with a random or pseudo-random array of pits. Alternatively, the surface may be etched, or formed against a mould having a rough surface caused by etching or coarse polishing.

Preferably, pits formed by embossing the surface have a maximum lateral dimension (for example the diameter, if the pits are circular) in the range 0.5 to 1.2 microns with shaped sides although as the resolution of the scanning means increases the maximum desirable diameter will decrease. The converse is also true namely if the resolution of the scanning means decreases the maximum desirable diameter will increase. The surface roughness, as defined by the conventional $R_a$ value which is related to the root mean square deviation of the surface profile, is preferably in the range of $R_a = 0.2$–$0.4$ $\mu$m.

By having the supporting surface permanently embossed, time is saved by the operator and there is less cause for cleaning the scanner and transparency to remove residual coatings such as oil and anti-Newton's rings spray.

The embossed layer may be removably fixed in position on the supporting surface so that the layer can be replaced if it becomes necessary e.g. due to wear and tear.

BRIEF DESCRIPTION OF THE INVENTION

Figure 2:
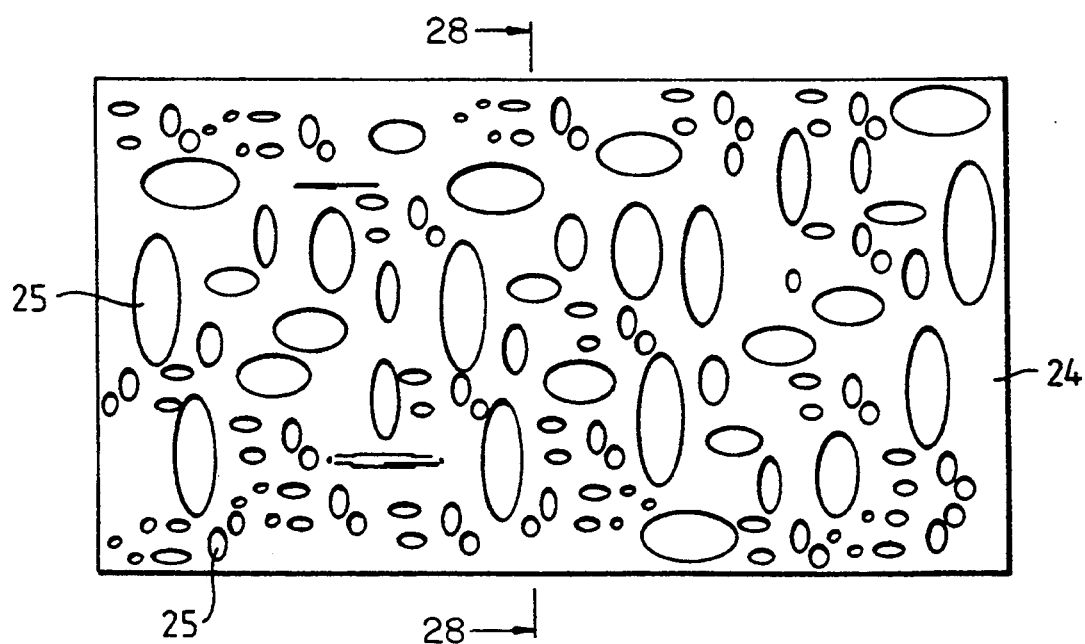
Figure 3:
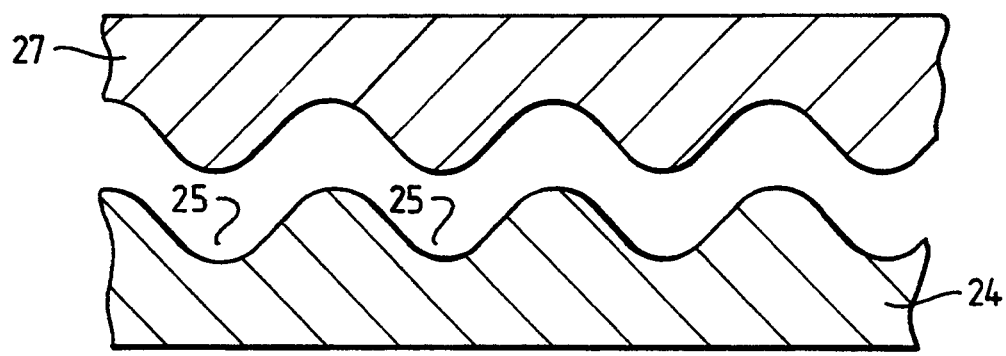
Figure 4:
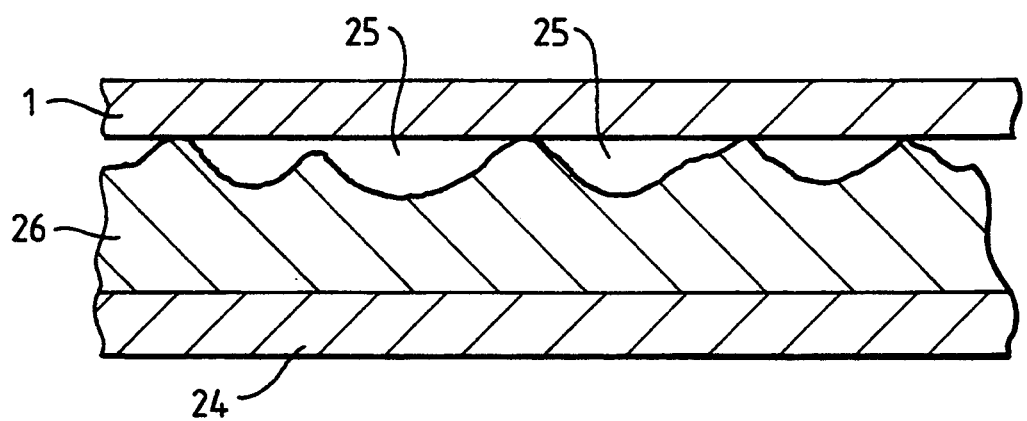

An example of scanning apparatus according to the present invention will now be described and contrasted with a conventional apparatus with reference to the accompanying drawings, in which:

FIG. 1 shows conventional scanning apparatus;

FIG. 2 indicates an area of the scanner surface which has been embossed according to an example of the present invention;

FIG. 3 is a section not to scale along a line 28—28 in FIG. 2, showing an embossed surface being formed using a mould; and, FIG. 4 is a section not to scale along a line 28—28 in FIG. 2, showing a transparency on a scanner drum with a separate embossed layer.

EMBODIMENT

In FIG. 1, a transparent original 1 to be reproduced is wrapped around the surface of a transparent drum 12. A xenon lamp 3 directs light rays into the drum and on to a 45° mirror 4, from which the rays pass through the wall of the drum and through the transparent original 1. These light rays reach an analysing head 5 containing colour filter and photoelectric devices such that signals representing the red, blue and green densities of the scanned element of the picture 1 are produced on lines 6, 7 and 8 respectively. The colour density signals 6, 7 and 8 are input to image processing electronics 23, which stores an electronic representation of the image on the transparency. The image processor can then be used in a conventional way to modify the stored signals in a desired manner. The colour density signals 6, 7 and 8 are stored in terms of digital numbers, each number corresponding to a pixel point where a measurement is taken. Each pixel point is surrounded by a corresponding sample area which is illuminated by the scanning beam, and from which the value of the pixel is derived. Pixel points may be arranged so that sample areas overlap, butt up together, or are separated. Because printing is carried out in subtractive colours, the lines 6, 7 and 8 will be considered to be part of the cyan, yellow and magenta colour channels. The analysing head 5 is mounted on a lead screw 9 which is driven in synchronism with the rotation of the drum 12 by a motor 10. As a consequence, the analysing head sees a point on the drum 12 which, as the drum rotates and the analysing head moves along its lead screw, traces out a helical path along the drum 12 and consequently traces out a number of parallel scanning lines on the original 1. An example of such apparatus is the Crosfield Magnascan.

A light-sensitive sheet 11 to be exposed is mounted on the drum 12. The drum 12 is mounted on a shaft 13 driven by a motor 14. The motor also drives a slotted disc 15, the slotted periphery of which rotates between a light source 16 and a photoelectric cell 17. Pulses derived from the photoelectric cell 17 are applied to a control unit 18 which controls the rotation of the motor 10, driving the lead screw for the analysing head, and a motor 19 which drives a lead screw 20 on which is mounted an exposing head 21. The exposing head 21 includes a light source which is modulated by a signal on a line 22 from the image processor 23. This signal is derived from the input signals on lines 6, 7 and 8 in the following manner. During scanning the drum rotates and an analyse head monitors a (laser) radiation beam reflected from successive scan lines as the head tracks parallel to the drum axis.

Conventionally, the transparency 1 will be sprayed with an anti-Newton's rings spray before application to the drum 1 or else a layer of oil is spread between the surface of the transparency, in contact with the drum, and the drum.

In the present invention, the surface of the drum 1 is provided with a random or pseudo-random pattern of closely packed embossed pits 25 (FIG. 2). The diameter of these is generally between 0.5 and 1.2 microns, although this can vary according to the resolution of the scanner. Within any random pattern, pits of varying diameter are embossed on the drum surface 24. By shaping the sides of the pits to have a smoothly varying diameter they can be cleaned more easily than a "top-hat" shaped pit and are more effective in preventing detectable Newton's rings from forming.

The size of the pits is such that they are small enough not to be resolved by the scanner, generally with a maximum lateral dimension about ten times smaller than the maximum lateral dimension of a sample area. The same effect occurs for the Newton's rings formed within the pits. The depth of the pits must be large enough to allow a number of fringes to form within them. This sets a lower or minimum limit of 0.7 microns to the pit depth. In addition, the depth of the pits should not be smaller than half the wavelength of the illuminating light to prevent the pits from giving the surface a "moth eye" finish or cause the surface to appear smooth and shiny. The $R_a$ value of the surface roughness is preferably in the range of $R_a = 0.2$–$0.4$ $\mu$m.

The packing of the pits within a sample area is chosen so that the average effect, between sample areas of the disturbances caused by the pits is not apparent to the scanner. That is, the electronic representation of an image is stored in terms of digital pixel values, each pixel value corresponding to the colour content of a sample area on the transparency and the support, and the number of pits within a sample area is such that the average effect as measured by the pixel value over a sample area is less than the difference between two adjacent levels of digitisation. If there are n pits to a sample area then the noise between the sample areas caused by the pits is the square root of n of the noise if there was only one pit per sample area. For this reason, the pits should be packed as closely as possible. If the pattern of pits was non-random the arrangement of a regular structure would produce a weak diffraction grating and thereby give patterning on the scanned image.

The surface undulations may be formed directly onto the surface of the support, or they may be formed by thermosetting the surface of the support against a mould surface, the mould surface having irregular undulations. FIG. 3 illustrates the surface of the support 24, which has been moulded against a mould surface 27 having corresponding surface undulations. The undulations may be formed in the surface of the support, or the mould surface, in a number of ways.

The undulations may be formed by embossing. An embossing tool is applied under pressure to the surface, with or without heating according to the material of the surface. The temperature required may be from ambient up to the melting point of the surface material. The transparency support is typically made of a plastic or thermoplastic material.

Other techniques for forming the undulations are by chemical etching, solvent treatment, photoresist or electron beam resist methods, diamond turning or laser machining. Alternatively, undulations of a suitable dimension may be formed by roughening the surface by chemical or electrochemical etching, or by abrading the surface with a coarse polishing medium. A good random pattern of 1 μm can also be produced with laser speckle.

By the method of the present invention, the frequency of the Newton's rings is increased to the extent that they are not resolvable.

An alternative to directly embossing the support surface 24 is to provide an additional layer on the top of the support surface. This is shown in FIG. 4. The support surface 24 is provided with a layer 26 in which a random pattern of pits 25 has been embossed. The transparency 1 is then positioned on this surface.

I claim:

1. Scanning apparatus including a transparency support defining a transparency support surface and scanning means for scanning a transparency on said support surface of said image defined by said transparency, wherein said transparency support surface defines a surface profile with irregular undulations such that Newton's rings are formed between said transparency support surface and said transparency, and the spatial frequency of said Newton's rings is higher than the frequency resolvable by said scanning means.

2. Scanning apparatus according to claim 1, wherein said support surface is formed integrally with said support.

3. Scanning apparatus according to claim 1, wherein said irregular undulations are in the form of pits, and wherein the lateral dimensions of said pits are small enough to produce Newton's rings with a frequency such that they cannot be resolved by said scanning means, and wherein the depth of said pits is not substantially smaller than half the wavelength of the illuminating light from said scanning means.

4. Scanning apparatus according to claim 3, wherein the maximum lateral dimension of said pits is in the range 0.5 to 1.2 microns.

5. Scanning apparatus according to claim 1, wherein said electronic representation is stored by said scanning means in terms of digital pixel values having a series of levels of digitisation, each pixel value corresponding to the colour content of a sample area on said transparency and said transparency support surface, wherein the number of pits within a sample area is such that their average effect over said sample area as measured by said pixel value is less than the difference between two adjacent levels of digitisation.

6. Scanning apparatus according to claim 5, wherein the maximum lateral dimension of said pits is less than ten times smaller than the maximum lateral dimension of a sample area.

7. Scanning apparatus according to claim 1, wherein said transparency support surface has an $R_a$ number between 0.2 and 0.4 μm.

8. Scanning apparatus according to claim 1, wherein said transparency support has a fixed surface layer defining the transparency support surface in which said undulations are provided and which may be removed from the transparency support.

9. Scanning apparatus according to claim 1, wherein the spatial frequency of said irregular undulations is such that the frequency of the Newton's rings produced by said undulations is higher than the frequency resolvable by said scanning apparatus.

10. A method of producing a transparency support defining a transparency support surface for a scanning apparatus, said scanning apparatus including scanning means for scanning a transparency on said transparency support surface to generate an electronic representation of an image defined by said transparency, the method including the step of providing irregular undulations in said transparency support surface, wherein said transparency support surface is formed with a surface profile having irregular undulations such that Newton's rings are formed between said transparency support surface and said transparency, and the spatial frequency of said Newton's rings is higher than the frequency resolvable by said scanning means in use.

11. A method according to claim 10, wherein said irregular undulations are formed by thermosetting said transparency support surface against a mould surface, said mould surface having irregular undulations.

12. A method according to claim 11, whereby said mould surface has irregular undulations formed in it by solvent treatment, photoresist or electron beam resist methods, diamond turning, laser machining, applying an embossing tool under pressure to the surface, chemical or electrochemical etching or abrading the surface with a coarse polishing medium.

13. A method according to claim 10, whereby said transparency support surface has irregular undulations formed in it by solvent treatment, photoresist or electron beam resist methods, diamond turning, laser machining, applying an embossing tool under pressure to the surface, chemical or electrochemical etching or abrading the surface with a coarse polishing medium.

* * * * *